United States Patent
Joong et al.

(10) Patent No.: US 8,498,805 B2
(45) Date of Patent: Jul. 30, 2013

(54) SYSTEM AND METHOD FOR PASSIVE LOCATION STORAGE

(75) Inventors: Donald Joong, Montreal (CA); Adela Lebidoff, Montreal (CA); Edoardo Gavita, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/978,470

(22) Filed: Dec. 24, 2010

(65) Prior Publication Data
US 2012/0330544 A1 Dec. 27, 2012

(51) Int. Cl.
*G01C 21/00* (2006.01)
(52) U.S. Cl.
USPC .............................. 701/408; 382/103; 701/469
(58) Field of Classification Search
USPC .. 701/408, 469, 36; 382/103, 104; 340/573.1, 340/457, 539.11, 539.32, 937; 235/443; 307/10.1; 380/104
See application file for complete search history.

(56) References Cited

U.S. PATENT DOCUMENTS

| | | | |
|---|---|---|---|
| 7,266,220 B2 * | 9/2007 | Sato et al. | 382/104 |
| 7,456,735 B2 * | 11/2008 | Naito et al. | 340/539.11 |
| 8,212,665 B2 * | 7/2012 | Schoenberg et al. | 340/457 |
| 2006/0043181 A1 * | 3/2006 | Naito et al. | 235/443 |
| 2009/0010493 A1 * | 1/2009 | Gornick et al. | 382/103 |
| 2009/0212955 A1 * | 8/2009 | Schoenberg et al. | 340/573.1 |
| 2010/0049438 A1 * | 2/2010 | Hu et al. | 701/213 |
| 2012/0232749 A1 * | 9/2012 | Schoenberg et al. | 701/36 |
| 2012/0242476 A1 * | 9/2012 | Schoenberg et al. | 340/457 |

FOREIGN PATENT DOCUMENTS
WO 2010/081547 A1 7/2010

OTHER PUBLICATIONS
Android application "Where's my car", Google Play store, downloaded on Apr. 10, 2013; 2 pages.
Android application "Car Finder AR", Google Play store, downloaded on Apr. 10, 2013; 3 pages.

* cited by examiner

*Primary Examiner* — Behrang Badii
(74) *Attorney, Agent, or Firm* — Ericsson Canada Inc.; David J. Rahmer

(57) ABSTRACT

A system and method for automatically storing a geographic position, without requiring user interaction, makes use of the ability of a location-aware mobile device to detect its state of motion using velocity or type of movement information. A transition between motion states is used to determine a parking location of a vehicle.

16 Claims, 4 Drawing Sheets

SYSTEM AND METHOD FOR PASSIVE LOCATION STORAGE

TECHNICAL FIELD

The present invention relates generally to mobile electronic devices equipped with Global Positioning System (GPS) receivers or other location-based services.

BACKGROUND

Some of the modern generation of mobile electronic devices include geographical location sharing capabilities using GPS or other location-determining technologies. Examples of these mobile electronic devices include GPS-enabled wireless communication devices, PDA Pocket PCs or tablets, GPS-enabled smart phones or cellular phones, and GPS-enabled cameras. These devices can be made "location aware" by use of a GPS receiver that is either embedded as a GPS chipset or connected externally.

Alternatively to using GPS based technologies, a mobile device can determine its geographic position using other locating methods. Often referred to as positioning, with control plane locating, a service provider can determine the location of the mobile device based on the radio signal delay of the closest cell-phone towers. GSM localization involves finding the location of a mobile device in relation to its cell site using various means of multilateration of the signal from cell sites serving a mobile phone. Local-range technologies such as Bluetooth, Wi-Fi, infrared and/or RFID/Near Field Communication technologies can also be used to match devices to nearby services of known location.

As illustrated in FIG. 1 (prior art), an exemplary mobile device 100 with location-determining capabilities can communicate over the air via a wireless network 110 having a base station 120. The mobile device 100 can also communicate with, and receive GPS coordinates from, a GPS satellite 130.

Many mobile devices also include a motion detector module. The motion detector can include a motion sensor, for example, an accelerometer; a device used to determine the orientation and measure the magnitude (i.e. velocity) and direction of the acceleration of the device. Additionally a pedometer may also be included; a device that counts each step a person takes by detecting the motion of the person's hips.

Computer-implemented software applications are available for mobile devices which allow a user to store a current geographic location in memory for future retrieval. An example of such an application is "Where's My Car?" This application allows a user to manually enter and save the current location of the mobile device as a parked position of their vehicle. When returning to the vehicle, the application will retrieve and display the saved parked location, and launch the built-in maps application to navigate the user to the vehicle. One of the deficiencies of this application is it requires explicit instructions from the user to save the location information for the parked vehicle.

Other known applications rely on communication between the vehicle and its associated electronics and the mobile device. An example of such is detecting when a vehicle's Bluetooth™ speaker/microphone system is disconnected from the mobile device. The application can assume that the vehicle is in a parked position when a Bluetooth™ disconnect occurs and store the current location for future retrieval.

Accordingly, it should be readily appreciated that in order to overcome the deficiencies and shortcomings of the existing solutions, it would be advantageous to have a solution for automatically storing a location without requiring explicit interaction with the user.

SUMMARY

It is an object of the present invention to obviate or mitigate at least one disadvantage of the prior art.

In a first aspect of the present invention, there is provided a method for storing a parking location by a mobile device. The method comprises the steps of detecting a first motion state; detecting a second motion state; and storing, in a memory, a geographic position associated with the transition between the first motion state and the second motion state as a parking location.

In an embodiment of the first aspect of the present invention, at least one of the steps of detecting a motion state includes determining a velocity of the mobile device. Optionally, detecting a motion state further includes comparing the determined velocity to a predetermined threshold. In another embodiment, detecting a motion state includes determining a movement type of the mobile device. In another embodiment, prior to storing a geographic position, it is determined if the geographic position is a valid parking location. A valid parking location can optionally be determined by geo-fencing. In another embodiment, prior to storing a geographic position, the user is asked whether or not to store the geographic position as a parking location. In another embodiment, a stored parking location is retrieved from memory by request from the user. Optionally, a stored parking location is selected from a plurality of stored parking locations based on the current geographic position of the mobile device. In another embodiment, the method can include detecting a third motion state associated with the transition between the first motion state and the second motion state.

In a second aspect of the present invention, there is provided a mobile device. The mobile device comprises a motion detector and a memory. The motion detector detects a first motion state and second motion state, and the memory stores a geographic position associated with a transition between the first motion state and the second motion state as a parking location.

In an embodiment of the second aspect of the invention, the motion detector determines the velocity of the mobile device. In another embodiment, the motion detector determines the movement type of the mobile device. Optionally, at least one of the determined velocity and the determined movement type is compared to a predetermined threshold. In another embodiment, the mobile device determines if the geographic position is a valid parking location. In another embodiment, prior to storing the geographic position, the mobile device requests input from a user whether to store the parking location or not. The mobile device can retrieve, from the memory, the stored parking location after receiving a request for retrieval from a user. Optionally, the parking location to be retrieved can be selected from a plurality of stored parking locations using the current geographic position of the mobile device. In another embodiment, the motion detector further detects a third motion state; the third motion state is associated with the transition between the first motion state and the second motion state.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
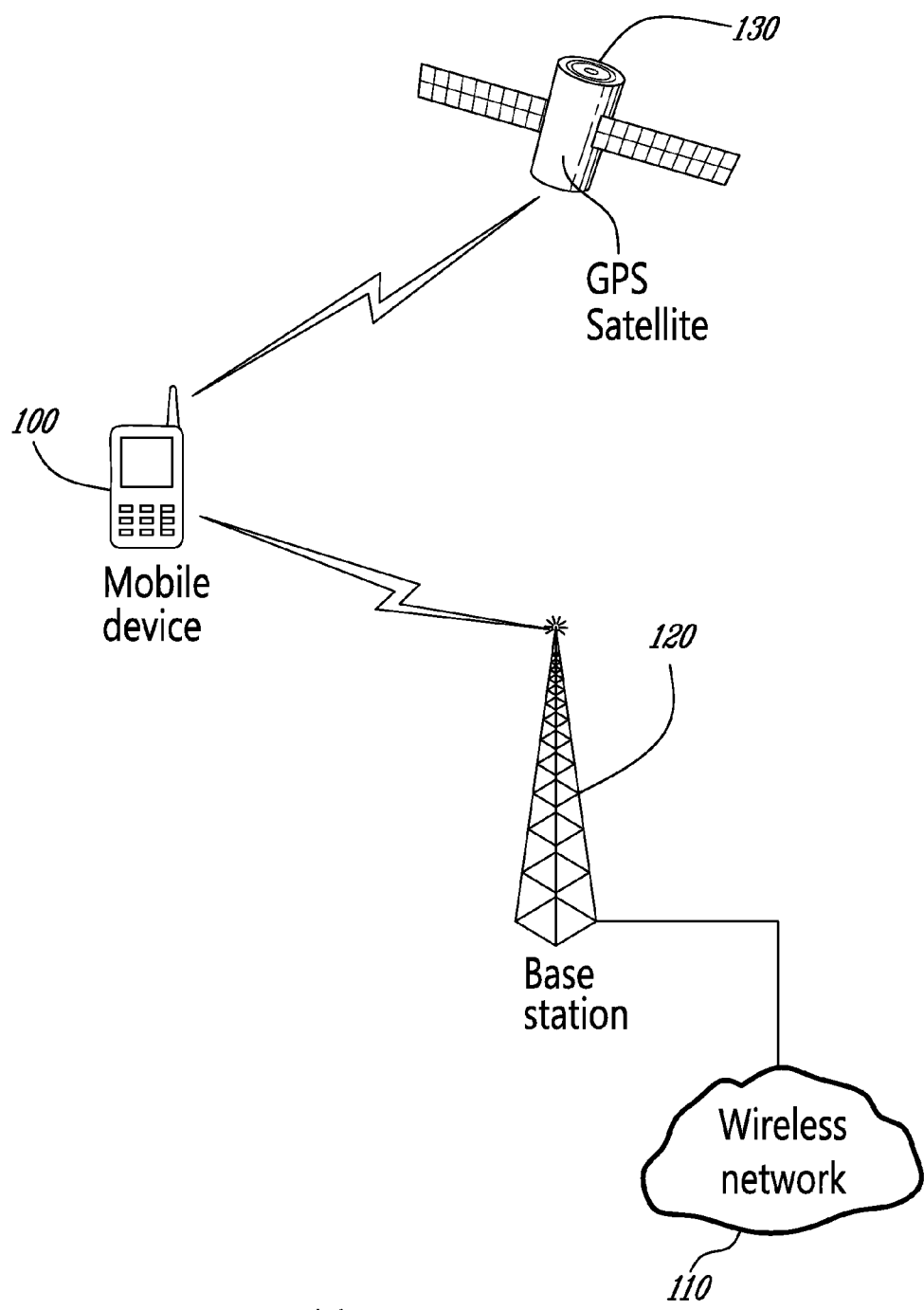
FIG. 1 is a block diagram illustrating a prior art mobile device and network.

The innovative teachings of the present invention will be described with particular reference to various exemplary embodiments. However, it should be understood that these embodiments provide only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several figures.

The present invention is generally directed to a system and method for a mobile electronic device with location-determination capabilities to automatically determine and store the location of a parked vehicle without requiring interaction with the user.

For the purposes of this specification, the expression "mobile device" is meant to encompass a broad range of portable devices such as wireless communication devices, PDA Pocket PCs or tablets, GPS-enabled smart phones or cellular phones, and GPS-enabled cameras.

Although the present disclosure refers expressly to "Global Positioning System" and "GPS", it should be understood that these terms are being used expansively to include any satellite-based navigation-signal broadcast system.

Figure 2:
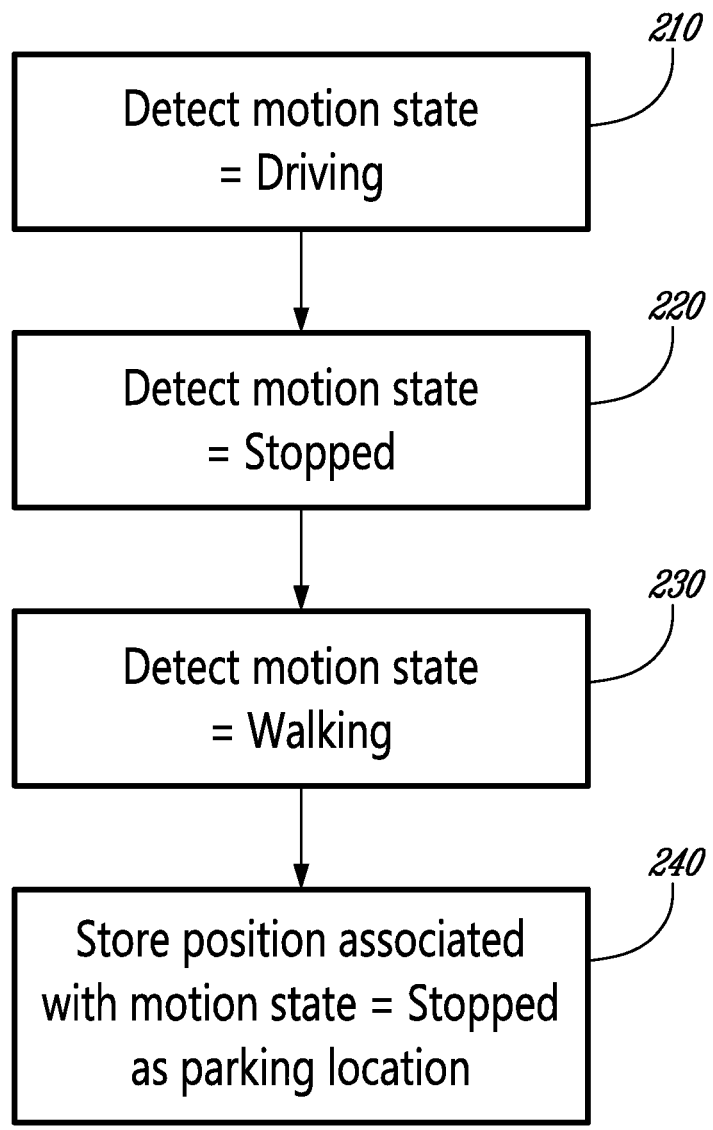
FIG. 2 is a flowchart illustrating some of the main steps of a method for automatically storing a parking location.

FIG. 2 is a flowchart illustrating some of the main steps of a method for automatically storing a parking location of the present invention. In step 210, the mobile device detects that it is in a driving motion state. The mobile device can determine the velocity of its movement based on GPS and/or cellular radio information. When the velocity is above a predetermined threshold, it can be assumed that the mobile device is in a moving vehicle. The average human walking speed is between 4 and 5.5 km/h and the average human running speed can be between 10 and 20 km/h. For exemplary purposes, it can be assumed that the mobile device is in a driving state when its speed is above 20 km/h.

In step 220, the mobile device detects that it is in a stopped motion state. When the velocity of the mobile device is determined to be 0 km/h (i.e. its location remains unchanged for a period of time), it can be assumed that the mobile device is in a stopped, or stationary, position.

In step 230, the mobile device detects that it is in a walking motion state. For the purpose of brevity, all natural human movements such walking, running, jogging, marching, etc will be referred to as simply a walking motion. When the velocity of the mobile device is measured, compared to a threshold, and determined to be in the range of human walking or running speeds, it can be assumed that the mobile device is no longer traveling in a vehicle, but is now with the user on foot.

The walking motion state can alternatively be detected by use of the motion detector of the mobile device. Either, or both, of the accelerometer or pedometer can be used to determine that the mobile device is traveling in a walking, jogging or running motion.

The mobile device can continuously monitor its motion state, or alternatively, it may detect motion states at periodic intervals. The mobile device may keep a log or buffer of the detected motion states in its internal memory. Alternatively, the motion states may be communicated to the network and stored in a memory device external to the mobile device.

The motion state can be detected in each of steps 210, 220 and 230 by determining the velocity of the mobile device, or the movement type of the mobile device, or a combination of both velocity and movement types. The velocity of the mobile device can be measured by utilizing GPS information, other location-determination information, a timing device, the rate at which hand offs occur between cells in the cellular network, and a variety of other methods. The velocity can be compared one or more predetermined thresholds to determine the motion state. The movement type of the mobile device can be determined by use of a motion sensor, such as an accelerometer. Single- and multi-axis accelerometers can detect magnitude and direction of the acceleration as a vector quantity, and can be used to sense orientation, acceleration, vibration shock, and falling, as an example. Both the velocity and movement type measurements can be compared to known thresholds or parameters for typical motion states (i.e. stationary, walking, running, travelling in a vehicle, travelling in an airplane, etc) to determine the motion state of the mobile device at any given time.

Each motion state can have a geographic position or location associated with it. This can be determined either before the motion state is detected, while the motion state is being detected, or after the motion state has been detected. Determining the current location of the device at steps 210, 220 and 230 can be accomplished most precisely using a location-determining system such as a GPS receiver embedded or otherwise connected to the mobile device. It will be appreciated by one skilled art that other types of location-determining system can be used, even if it is less precise than GPS, including location-determining systems that determine an approximate location of the mobile device by radiolocation or triangulation techniques. Alternatively, an approximate location can be determined by identifying the closest base station or Wi-Fi access point, or a combination of the techniques described herein.

In step 240, the mobile device determines that there has been a transition from a driving motion state to a stopped motion state to a walking motion state. The position associated with the stopped motion state is stored in memory as a parking location for future retrieval. The user may then request retrieval of the parking location via the mobile device or through any other means.

Although this exemplary implementation has been described in terms of storing the motion states and associated locations in a memory on a mobile device, it will be appreciated that the mobile device could be simply used to capture the data, detect the motion state and the location, and then wirelessly transmit the data to a server or other computing device for storage.

For the purposes of this specification, the expression "memory" is meant to encompass any type of mechanism for data storage, such as volatile or non-volatile memory.

In an alternative embodiment, the mobile device may include the additional step of filtering parking locations before storing them by determining if the geographic position is in fact a valid parking location or not. This is often referred to as geo-fencing. A geo-fence is a virtual perimeter for a real-world geographic area and can be dynamically generated, as in a radius around a point of interest, or it can be a predefined set of boundaries, like school zones or neighbourhood boundaries. When the location-aware mobile device enters or exits a geo-fence, the device can receive a generated notification. For example, if the position associated with the stopped motion state is a highway, it is unlikely that the position is a valid parking location. However, if the position associated with the stopped motion state is a residential street or in close proximity to a shopping center, it is likely that that the position is a valid parking location.

In another alternative embodiment, the mobile device can request an input from the user confirming whether to store the parking location, or not, prior to storing a position associated with a stopped motion state. The user can confirm if the position is a valid parking location which should be saved, or not. It will be appreciated by those skilled in the art that the confirmation request and user interaction can be implemented by the display and input device(s) associated with the mobile device.

The mobile device may store more than one position as parking locations, as described in the methods above. When the user requests to retrieve a parking location, a plurality of parking locations may be retrieved and displayed by the mobile device. In an alternative embodiment, the mobile device may select only the stored parking location which is closest in proximity to the current geographic position of the mobile device for retrieval. Alternatively, a plurality of stored parking locations can be presented to the user in order of their geographic proximity to the current position of the mobile device.

The mobile device can optionally use its built-in navigation system or communicate with the network to provide the user with directions from its current position to the stored parking location.

It will be appreciated by those skilled in the art that in alternative embodiments to the methods described herein, it is not necessary to detect all three motions states of driving, stopped and walking in order to store an appropriate parking location associated with the stopped position of a vehicle.

Figure 3:
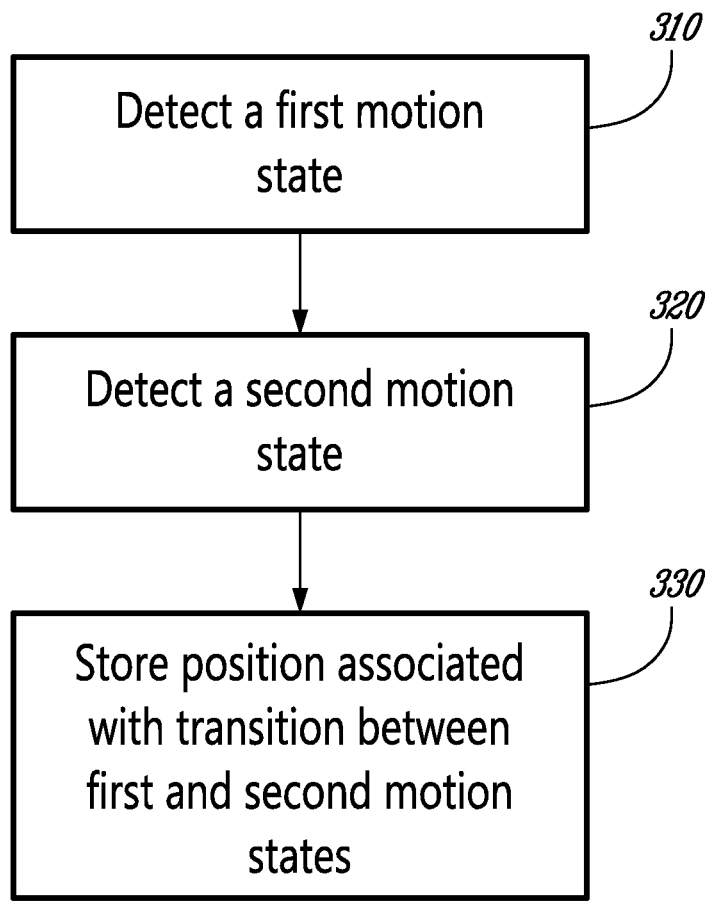
FIG. 3 is a flowchart illustrating some of the main steps of a method for automatically storing a parking location.

FIG. 3 is a flowchart illustrating some of the main steps of a method for automatically storing a parking location of the present invention. In step 310, a first motion state is detected. In step 320, a second motion state is detected, the first and second motion states being different from one another. The motion states can be detected by determining velocity and/or movement type and comparing to predetermined thresholds as previously described herein. In step 330, a transition between the first motion state and the second motion state is detected and a geographic position associated with that transition is stored or saved in memory as a parking location.

The transition between the first and second motion states can be determined to be last occurrence of the first motion state, the first instance of the second motion state, or a point between the last occurrence of the first motion state and the first instance of the second motion state. The geographic position associated with the transition can be the position associated with the last occurrence of the first motion state, the position associated with the first instance of the second motion state, or an approximation of a position between the position of the last occurrence of the first motion state and the position of the first instance of the second motion state.

Alternatively, a third motion state may be detected which is associated with a transition between the first motion state and the second motion state. The geographic position associated with the third motion state can be stored as the parking location.

In a variation of FIG. 3, the first motion state is determined to be driving in step 310 and the second motion state is determined to be walking in step 320. In step 330, a geographic position associated with the transition between the driving state and the walking state is determined and stored as a parking location for future retrieval. In a further variation, a third motion state, associated with the transition between driving and walking, is determined to be a stopped motion state. In step 330, the geographic position associated with the stopped motion state is stored as a parking location for future retrieval.

In another variation of FIG. 3, the first motion state is determined to be driving in step 310 and the second motion state is determined to be stopped in step 320. In step 330, the geographic position associated with the transition between the driving state and the stopped state is determined and stored as a parking location for future retrieval.

In another variation of FIG. 3, the first motion state is determined to be stopped in step 310 and the second motion state is determined to be walking in step 320. In step 330, the geographic position associated with the transition between the stopped state and the walking state is determined and stored as a parking location for future retrieval.

Figure 4:
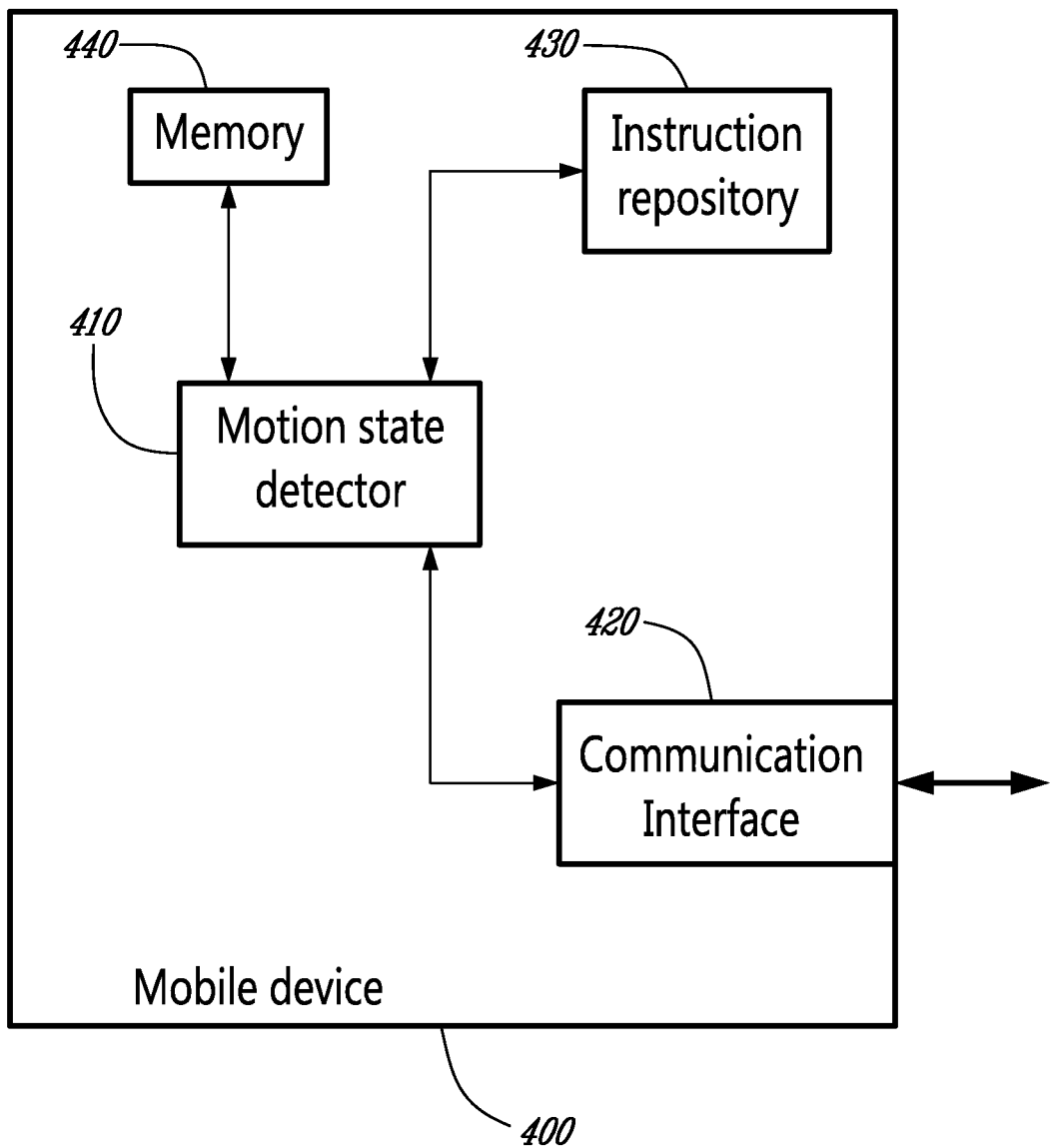
FIG. 4 is a block diagram illustrating a mobile device according to an embodiment of the present invention.

FIG. 4 illustrates a mobile device 400 of the present invention. The mobile device 400 includes a motion state detector 410 which controls and interacts with a communication interface 420. An instruction repository 430 stores instructions to be executed by the motion state detector 410. The motion state detector can include a processor or it can interact with a processor (not shown) in the mobile device 400. The motion detector 410 instructs the communication interface 420 to send and receive GPS and other location information. The motion state detector 410 can include a motion sensor, such as an accelerometer or a pedometer. The mobile device 400 includes a memory 440 which can store at least one parking location for future retrieval. The memory 440 can alternatively be included in the instruction repository 430, or vice versa, the instruction repository 430 can be included in the memory 440. The mobile device 400 can implement any of the methods of the present invention as described in FIGS. 2 and 3. One skilled in the art will appreciate that in implementation, the functions of the motion state detector 410 and its associated processor can be provided by general purpose processors, or task specific processors, that execute instructions stored in the instruction repository 430 that enable the above described functionality. The communication interface 420 can be implemented through a single network connection, or multiple network connections using standard wired or wireless network interfaces and being controlled by the motion detector 410 and its associated processor.

The motion detector 410 detects a first motion state and a second motion state. Detecting motion states can include determining a velocity and/or a movement type of the mobile device 400. The motion detector 410 can compare the determined velocity and/or movement type to a predetermined threshold to determine if the motion state is one of a driving state, a walking state or a stopped state. The mobile device 400 stores a geographic position associated with a transition between a first motion state and a second motion state as a parking location in the memory 440. Prior to storing a geographic position in the memory 440, the mobile device 400 can determine if the geographic position is a valid parking location by geo-fencing or other location-determination methods. Prior to storing a geographic position in the memory 440, the mobile device 400 can ask the user for an input confirming whether the geographic position should be stored as a parking location or not. The user can request to retrieve a stored parking location from the memory 440. A stored parking location can be selected for retrieval, from a plurality of stored parking location, based on the current location of the mobile device 400. The parking location in closest proximity to the current geographic position of the mobile device 400 at the time of the user request can be retrieved. The motion detector 410 can further detect a third motion state associated with the transition between the first motion state and the second motion state. The geographic position associated with the third motion state can be stored in the memory 440 as a parking location.

Based upon the foregoing, it should now be apparent to those of ordinary skill in the art that the present invention provides an advantageous solution. Although the system and method of the present invention have been described with particular reference to certain type of messages and nodes, it should be realized upon reference hereto that the innovative teachings contained herein are not necessarily limited thereto and may be implemented advantageously in various manners. It is believed that the operation and construction of the present invention will be apparent from the foregoing description.

Embodiments of the invention may be represented as a software product stored in a machine-readable medium (also referred to as a computer-readable medium, a processor-readable medium, or a computer-usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those skilled in the art without departing from the scope of the invention, which is defined solely by the claims appended hereto.

What is claimed is:

1. A method for storing a parking location by a mobile device with access to a memory, the method comprising:
   detecting a first motion state, which is a driving state;
   detecting a second motion state, which includes all natural human movements;
   detecting a third motion state, which is a stopped state where the location remains unchanged for a period of time associated with the transition between the first motion state and the second motion state;
   storing, in the memory, a geographic position associated with the stopped state as the parking location.

2. The method of claim 1, wherein at least one of the steps of detecting includes determining a velocity of the mobile device.

3. The method of claim 2, wherein at least one of the steps of detecting further includes comparing the determined velocity to a predetermined threshold.

4. The method of claim 1, wherein at least one of the steps of detecting includes determining a movement type of the mobile device.

5. The method of claim 1, further comprising, prior to the step of storing, the step of determining if the geographic position is a valid parking location.

6. The method of claim 5, wherein the valid parking location is determined by geo-fencing.

7. The method of claim 1, further comprising, prior to the step of storing, the step of requesting an input from a user confirming whether to store the parking location.

8. The method of claim 1, further comprising the step of retrieving, from the memory, the stored parking location after receiving a request for retrieval from a user.

9. The method of claim 8, wherein the step of retrieving the stored parking location includes selecting a parking location from a plurality of stored parking locations using a current geographic position of the mobile device.

10. A mobile device comprising:
    a motion detector, the motion detector for detecting a first motion state which is a driving state, for detecting a second motion state which includes all natural human movement, and for detecting a third motion state which is a stopped state where the location remains unchanged for a period of time, the third motion state associated with a transition between the first motion state and the second motion state; and
    a memory for storing a geographic position associated with the stopped state as a parking location.

11. The mobile device of claim 10, wherein the motion detector is configured to determine at least one of a velocity of the mobile device and a movement type of the mobile device.

12. The mobile device of claim 11, wherein the motion detector is configured to compare at least one of the determined velocity and the determined movement type to a predetermined threshold.

13. The mobile device of claim 10, further comprising, prior to storing the geographic position, the mobile device determining if the geographic position is a valid parking location.

14. The mobile device of claim 10, further comprising, prior to storing the geographic position, the mobile device requesting an input from a user confirming whether to store the parking location or not.

15. The mobile device of claim 10, further comprising, the mobile device retrieving, from the memory, the stored parking location after receiving a request for retrieval from a user.

16. The mobile device of claim 15, wherein the mobile device is configure to select the stored parking location from a plurality of stored parking locations using a current geographic position of the mobile device.

* * * * *

(12) SUPPLEMENTAL EXAMINATION CERTIFICATE

United States Patent  
Joong et al.

(10) Number: US 8,498,805 F1  
(45) Certificate Issued: Jul. 17, 2014

Control No.: 96/000,067  
Primary Examiner: Peng Ke

Filing Date: May 23, 2014

No substantial new question of patentability is raised in the request for supplemental examination. See the Reasons for Substantial New Question of Patentability Determination in the file of this proceeding.

(56) Items of Information

U.S. PATENT DOCUMENTS

WO 2007/083,997    7/2007    Geelen